United States Patent
Finkelstein et al.

(10) Patent No.: US 8,353,020 B2
(45) Date of Patent: Jan. 8, 2013

(54) TRANSPARENTLY EXTENSIBLE FIREWALL CLUSTER

(75) Inventors: Amit Finkelstein, Haifa (IL); Avihai Lifschitz, Bellevue, WA (US); Yosef Dinerstein, Haifa (IL); Ziv Caspi, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 11/453,778

(22) Filed: Jun. 14, 2006

(65) Prior Publication Data

US 2007/0294754 A1 Dec. 20, 2007

(51) Int. Cl.
H04L 29/06 (2006.01)

(52) U.S. Cl. .............. 726/11; 709/229; 726/1; 726/17

(58) Field of Classification Search ............. 395/187.01; 709/229; 713/201
See application file for complete search history.

(56) References Cited

U.S. PATENT DOCUMENTS

| | | | |
|---|---|---|---|
| 5,623,601 A | 4/1997 | Vu | 395/187.01 |
| 5,826,014 A * | 10/1998 | Coley et al. | 726/12 |
| 6,154,775 A | 11/2000 | Coss et al. | 709/225 |
| 6,851,063 B1 | 2/2005 | Boyle et al. | 713/268 |
| 6,880,089 B1 * | 4/2005 | Bommareddy et al. | 726/11 |
| 7,359,992 B2 * | 4/2008 | Berthaud et al. | 709/249 |
| 7,603,696 B2 * | 10/2009 | Trumper et al. | 726/1 |
| 2003/0018914 A1 | 1/2003 | Cheng et al. | 713/201 |
| 2003/0123483 A1 | 7/2003 | Donatelli et al. | 370/469 |
| 2003/0131262 A1* | 7/2003 | Goddard | 713/201 |
| 2004/0133690 A1* | 7/2004 | Chauffour et al. | 709/229 |
| 2004/0205250 A1 | 10/2004 | Bain et al. | 709/249 |
| 2005/0185646 A1 | 8/2005 | Karino et al. | 370/389 |

FOREIGN PATENT DOCUMENTS

WO WO 01/31874 A2 5/2001

OTHER PUBLICATIONS

S.Determan/C.Arthmann, Carrier Class Availability for Enterprises,pp. 1-7, 2002.*
"Check Point VPN-1/Firewall-1", http://www.f5.com/solutions/sb/vpn1_sb.html, 1998-2006 F5 Networks, Inc., 1 page.
"ISA Server 2004 Product Overview", http://www.infosecuritycanada.com/images/100358/Graphics2005/ISA2004_Product_Overview.pdf, 16 pages.
"Load Balancing: CISCO Content Content Switching Module Features", DataPipe-Managed Hosting Services-Load Balancing, http://www.datapipe.com/load_balancing_cisco.aspx, 1999-2005 DataPipe, 2 pages.
Application Note-"Firewall Load Balancing with Serveriron", http://www.foundrynet.com/solutions/appNotes/PDFs/FWLB.pdf, 4 pages.

* cited by examiner

Primary Examiner — Brandon Hoffman
Assistant Examiner — Michael D Anderson
(74) Attorney, Agent, or Firm — Woodcock Washburn LLP

(57) ABSTRACT

A generic master-slave mechanism enables a single processor of a cluster of firewall processors to define the behavior of the other processors in the cluster for a specific logical connection. The cluster of firewall processors utilizes virtual adapters representing physical adapters on other processors in the firewall cluster. This virtualization allows each cluster member to act as though it is a standalone machine that owns all local IP addresses of the entire cluster. When traffic is received by a firewall processor, the firewall processor determines if there is a master associated with the logical connection for the traffic. If so, the traffic is routed to the master. If no master is associated, in an example configuration, the receiving firewall processor becomes the master. A message traffic logical connection has a single master. A master remains the master of a logical connection until the connection is terminated.

17 Claims, 3 Drawing Sheets

TRANSPARENTLY EXTENSIBLE FIREWALL CLUSTER

TECHNICAL FIELD

The technical field generally relates to computer system firewalls and more specifically relates to implementing a plurality of computer system firewalls.

BACKGROUND

A firewall inspects message traffic in network environments typically for the purpose of enforcing firewall security policies. Firewalls comprise hardware and/or software that function to prevent non-secure traffic from traversing from one system or network to another. Firewalls also inspect traffic for cost and regulatory compliance. Often, to improve reliability and responsiveness, firewalls are implemented as clusters of processors (e.g., servers). A cluster comprises an array of processors, such as servers or the like, that share common tasks, such as enforcing rules of the firewall policy. The cluster appears as a single firewall to the systems/networks connected on either end.

Firewalls act as filters either preventing or allowing the passage of message traffic, often in the form of IP packets, in accordance with rules. While a simple policy based on the source and destination IP of message traffic can be applied on a per packet basis, a more advanced policy requires a context to be evaluated. For example, more advanced policies could allow a packet to pass only if a specific packet has previously passed, or only if an entire connection is enabled based on a previous connection. This type of policy inspection capability is typically referred to as "stateful inspection" and the context that is maintained is referred to as the "state".

Sharing the state between members of a cluster of firewall processors is difficult and problematic. Existing solutions typically duplicate the IP stack and all the state that is attached to the IP level processing. The drawback of this solution is that it does not handle states that apply to higher level protocols.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A cluster of firewall processors, also referred to as firewall members, utilizes virtual adapters that represent real adapters of other processors in the firewall cluster. This virtualization allows each cluster member to act as though it is a standalone machine that owns all local IP addresses of the entire cluster. The illusion, from each cluster member's perspective, of having all IP addresses available allows higher level components of the firewall to be unaware of the existence of the cluster. A firewall member can manage it state on other cluster members, and share connectivity of the entire cluster.

The cluster of firewall processors is implemented in a master-slave configuration such that the addition of firewall processors is transparent to the system and/or network connected to the firewall and is transparent to an administrator server of the cluster. A single cluster member defines the behavior for all other members of the cluster for a specific logical connection. The logical connection can comprise a single connection or multiple connections. For each logical connection, one of the firewall processors is assigned as the master processor. The master processor remains the master processor for the life of the logical connection. The master processor implements policy rules and passes the decisions to the other processors as appropriate. As message traffic, typically in the form of a packet, is received by the cluster of firewall processors, the message traffic is checked to determine if a matching state indicates that the message traffic has a context connecting it to an existing logical connection. If the packet belongs to a logical connection it hits the state created during establishment of the logical connection. If the packet does not hit such a state, a new logical connection for the packet is established. Upon establishment of the new logical connection, states are created dynamically to take care of other packets belonging to the logical connection. The states are created on the processor that is the master of the logical connection and on other processors utilizing virtual adapters. This process is transparent to the components that create states.

Further, the processing capabilities of the cluster of firewall processors is extensible via generic components referred to as firewall extension modules.

BRIEF DESCRIPTION OF THE DRAWINGS

The foregoing summary, as well as the following detailed description, is better understood when read in conjunction with the appended drawings. For the purpose of illustrating a transparently extensible firewall cluster, there is shown in the drawings exemplary constructions thereof; however, a transparently extensible firewall cluster is not limited to the specific methods and instrumentalities disclosed.

DETAILED DESCRIPTION OF ILLUSTRATIVE EMBODIMENTS

A generic master-slave mechanism enables a single processor of a cluster of firewall processors to define the behavior of the other processors in the cluster for a specific logical connection. The master-slave functionality is implemented to provide extensible processing capability to the cluster of firewall processors and to ensure proper processing in all levels when a cluster is used. The firewall extension modules support high level protocols in a way that allows scaling out the capability across the cluster of firewall processors. This mechanism also maintains load balancing of processing throughout the cluster. When traffic arrives to one of the firewall processors in the cluster, the firewall processor determines if there is any state that matches the traffic and instructions to forward it to another firewall processor. If there is, the traffic is forwarded to that other firewall processor (master). If there is no such state, the traffic is handled by the receiving cluster member which might create the logical connection for the traffic and who becomes the master for that logical connection. In an example embodiment, another cluster member is determined to be the master.

For example, in the master-slave environment, a voice over IP firewall extension module can use the existing firewall software to define the properties of the connections that are part of a specific VoIP session. All the connections will be routed through the rest of the firewall processors of the cluster to the master firewall processor for the specific VoIP session. The master firewall processor will control the VoIP session, filter the protocol and provide the capabilities for which it was developed, while still allowing load balancing of different VoIP logical sessions across the cluster of firewall processors.

Figure 1:
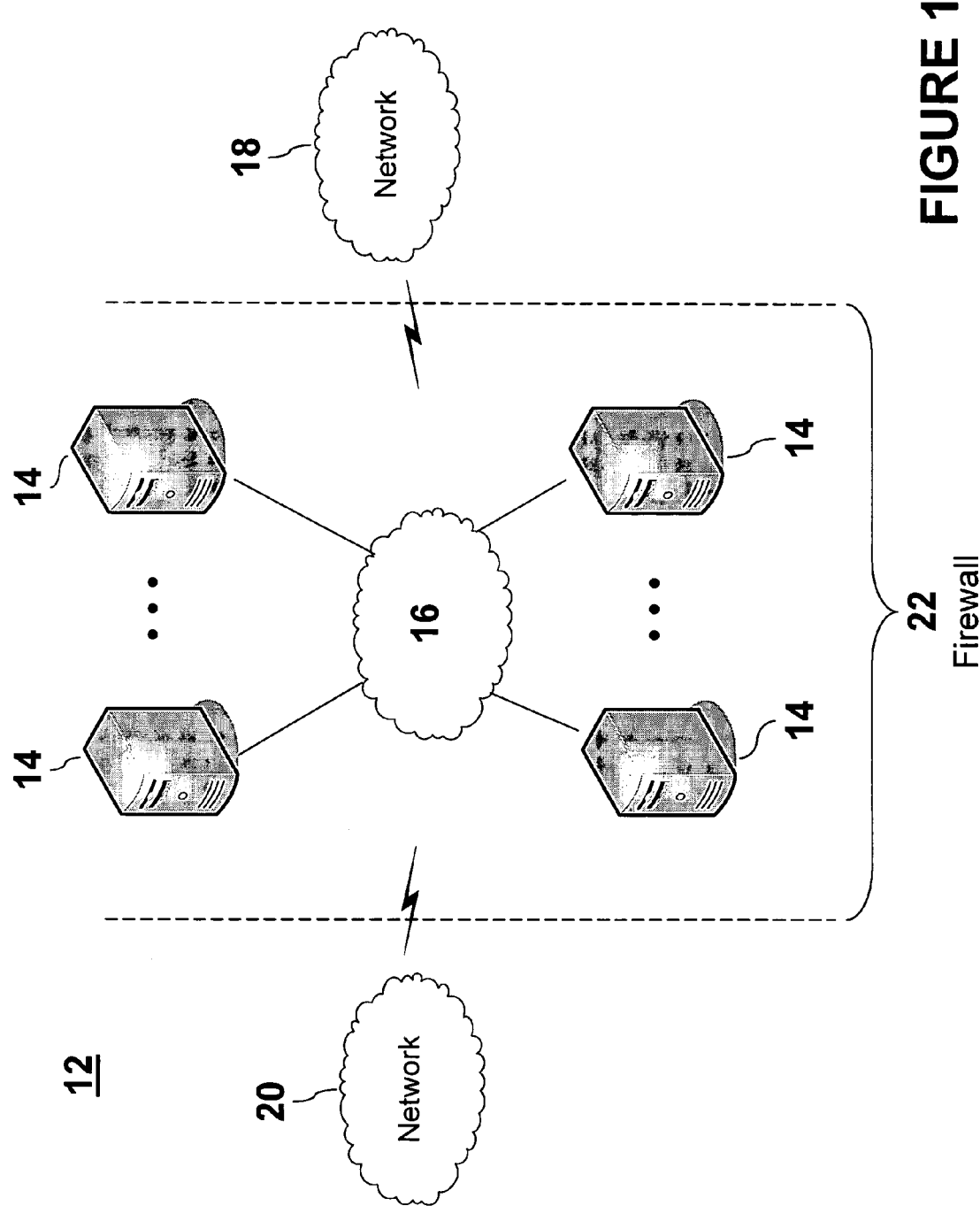
FIG. 1 is an illustration of an example cluster of firewall processors implemented in a firewall.

FIG. 1 is an illustration of an example firewall cluster 22 comprising a plurality of firewall processors 14. The firewall cluster 22 comprises at least one firewall processor (also referred to as a cluster member) 14. Each firewall processor 14 can comprise any appropriate type of processor, such as a general purpose processor, a dedicated processor, a desktop computer, a laptop computer, a Personal Digital Assistant (PDA), a handheld computer, a smart phone, a server processor, a client processor, or a combination thereof. Further, each cluster member 14 can be implemented in a single processor or multiple processors. Multiple processors can be distributed or centrally located. Multiple processors and multiple cluster members 14 can communicate wirelessly, via hard wire, or a combination thereof. The firewall processors 14 are coupled via the interface 16. The interface 16 can comprise any appropriate interface, such as a wired connection, a wireless connection, a network, an intranet, an internet, or the like, for example.

As illustrated in the example depiction of FIG. 1, the firewall cluster 22 is for evaluating policies and rules for controlling traffic between the networks 18 and 20. The networks 18, 20 represent any appropriate system, processor, and/or network with which the firewall cluster 22 can communicate. The firewall cluster 22 can communicate with the networks/systems, 18, 20, wirelessly, via hard wire, or a combination thereof. The firewall cluster 22 enforces security policies on traffic between the networks/systems 18, 20. The firewall provides policies based on rules and message traffic is evaluated in accordance with the criteria of the rules. Although the exemplary depiction in FIG. 1 shows two networks, each firewall cluster can separate and control traffic between any number of networks.

Figure 2:
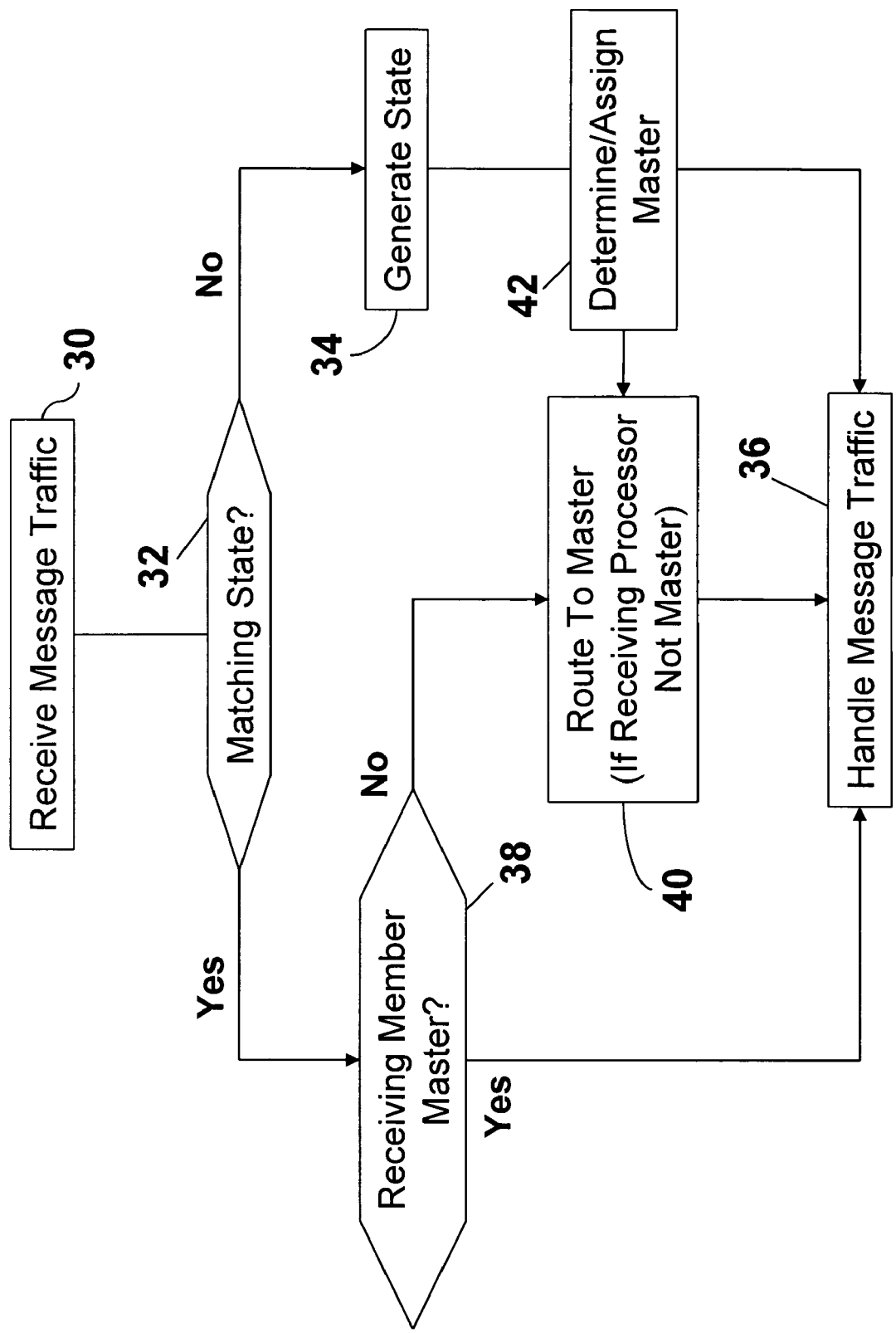
FIG. 2 is a flow diagram of an example process for managing a plurality of firewall processors.

FIG. 2 is a flow diagram of an example process for managing a transparently extensible cluster of firewall processors. The process shown in FIG. 2 is described with reference to the example configuration shown in FIG. 1. Message traffic is received by one of the firewall processors 14 at step 30. The firewall processor receiving the message traffic is referred to as the receiving processor. The receiving processor analyzes the message traffic at step 32 to determine if there is a matching state associated with the received message traffic. The message traffic is checked to determine if a matching state indicates that the message traffic has a context connecting it to an existing logical connection. A logical connection allows message traffic to be received by and routed within a firewall cluster. The logical connection can be established by any appropriate means in accordance with any appropriate protocol. A logical connection can be associated with received message traffic in any appropriate manner. In an example embodiment, the IP source address of the message traffic, the IP destination address of the message traffic, and/or the context of the message traffic can be used to define a logical connection. For example, message traffic received comprising the same IP source address and same IP destination address could be considered message traffic in the same logical connection.

If, at step 32, it is determined that there is no state matching the message traffic, the firewall processor evaluates the firewall policy for the message traffic and upon policy evaluation, the results may create a new state as shown at step 34. The new state identifies the master processor that handles the message traffic and indicates any virtual adapters that may be utilized to route message traffic to the master processor. The new state can be distributed to selected firewall processors in the cluster. The master processor is determined and assigned at step 42. A master processor can be determined in any appropriate manner. In an example embodiment, the receiving processor is determined to be the master processor for the logical connection. That is, if there is no dynamic state created for an established logical connection, the traffic is handled by the receiving processor. In another example embodiment, the master processor is determined in accordance with a load balancing algorithm. That is, a load balancing process is used to determine an available firewall processor of the cluster of firewall processors, and the available firewall processor is assigned as the master firewall processor. Any appropriate load balancing algorithm can be used. In yet another example embodiment, the master processor is arbitrarily selected from available firewall processors in the cluster. The firewall processor that was selected to be the master firewall processor is assigned as such at step 42. The message traffic is routed to the newly assigned master firewall processor for the logical connection at step 40. Obviously, if the receiving processor is the master processor, the message traffic is not routed to another processor. The message traffic is handled by the newly assigned master firewall processor at step 36.

If the received message traffic does match an existing state (step 32), the implication is that there is a master processor for the logical connection. In an example embodiment, if the received message traffic does match an existing state (step 32), it is determined, at step 38, if the receiving processor is the master processor for the logical connection. If the receiving processor is the master for the logical connection (step 38), the receiving processor handles the message traffic at step 36. In another example embodiment the state instructs to process message traffic on the salve processor without forwarding it to the master processor.

If the receiving processor is not the master (step 38), at step 40 the receiving processor routes the message traffic to the master firewall processor for the logical connection. A virtual adapter is utilized to route the message traffic to the master processor. A virtual adapter on a firewall processor represents a physical adapter of another firewall processor. Virtual adapters communication with physical adapters of firewall processors. The master firewall processor handles the message traffic at step 36.

In an example embodiment, traffic is received at step 30 in the form of packets. When a packet is received by the receiving processor, the content of the packet is evaluated (step 32). If the packet belongs to a logical connection, it matches the state (step 32) created during establishment of the logical connection. If the packet does not match such a state (step 32), the packet is handled by other policy rules, which can cause establishment of a new logical connection (step 34). Upon establishment of the new logical connection (step 34), the firewall dynamically creates states to take care of other packets belonging to the logical connection (step 34). The states are created (step 34) utilizing the virtual adapters' ability to create states on other cluster members. This process is transparent to the components that create states. When a packet arrives it can match a state (step 32) created during establishment of connection. The states are created on the firewall that owns the connection (the master for that connection) and on other firewall processors in the cluster. The states on other firewall processors are created via virtualization of network adapters (step 34). The packet is handled by the state and routed appropriately. States created on non-master cluster members will handle the packets in such a way that they will arrive at the master, if appropriate, and appear arriving from the virtual adapter that virtualizes the real adapter on the receiving firewall processor.

Figure 3:
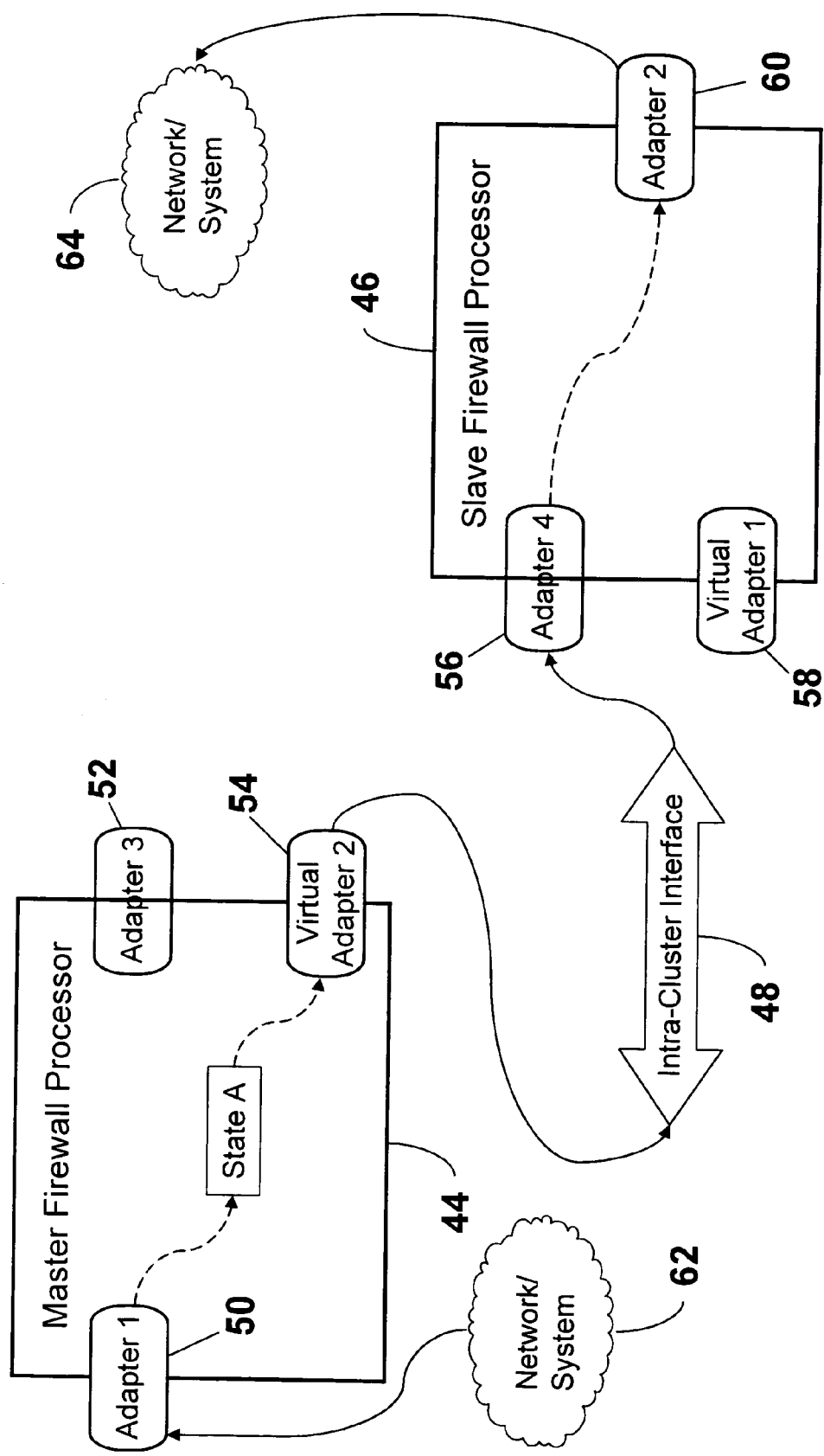
FIG. 3 is an example diagram depicting routing of information from a master firewall processor to a slave firewall processor.

FIG. 3 is an example diagram depicting routing of information from the network/system 62 via the master firewall processor 44 and the slave firewall processor 46, to the network/system 64. The firewall processor 44 comprises virtual adapter 54 and physical adapters 50 and 52. The firewall processor 46 comprises virtual adapter 58 and physical adapters 56 and 60. A virtual adapter on a firewall processor represents a physical adapter of another firewall processor. In the example configuration depicted in FIG. 3, the virtual adapter 54 represents physical adapter 60 and creates the illusion for firewall components that firewall processor 44 is virtually connected to the network/system 64. Virtual adapters communicate with physical adapters of firewall processors via the intra-cluster interface 48. A virtual adapter allows a firewall processor to interact with physical adapters of other firewall processors in the cluster and control physical adapters of other firewall processors via the same interface that the firewall processor uses to control its local physical adapter.

In an example embodiment, control is implemented via adapter instructions such as "bind" and "listen." When a local firewall processor listens or binds to a specific port in a virtual adapter on a remote (another) firewall processor, the local firewall processor will be able to receive the message traffic of the future connection that will be established. In such a scenario, the remote firewall processor is the slave processor of the interaction. The slave processor serves as a router, passing the message traffic to the local firewall processor. A virtual adapter exposes all necessary interfaces, such as allocation of TCP or UDP ports, for example. Implementation of a physical adaptor reserves a port. Implementation of a virtual adaptor that represents a physical adapter of another firewall processor uses the intra-cluster interface to remotely request the port allocation on the other firewall processor.

In an example embodiment, a network protocol is used to implement the communications in the intra-cluster interface 48. The network protocol translates instructions on a specific virtual adapter 54 to network protocol instructions that are passed to the slave firewall processor 46 via the intra-cluster interface 48. At the slave firewall processor 46, the network protocol instructions are translated to a state that ensures both the correct operations on the physical adapter 60 and the forwarding of the traffic to the appropriate entity, such as a master firewall processor, or the network/system 64, for example. Any appropriate network protocol can be used, such as Internet Protocol Security (IPSEC) tunnel mode, for example.

As depicted in FIG. 3, the firewall processor 44 is the master firewall processor and the firewall processor 46 is the slave firewall processor. State A was added via a firewall extension module. Message traffic was received from the network/system 62 and the receiving firewall processor is the master processor 44. The master firewall processor 44 evaluates the message traffic in accordance with the firewall policy. In case the traffic is allowed and needs to be sent to network/system 64, the traffic is routed to the slave firewall processor 46 to eventually be forwarded to the network/system 64. The traffic is routed via the virtual adapter 54 to the intra-cluster interface 48. The virtual adapter 54 exposes all interfaces necessary to allow the routing of the outcome to the physical adapter 60. The slave firewall processor 46 receives the outcome via the physical adapter 56. In the scenario depicted in FIG. 3, the slave firewall processor 46 acts as a conduit, passing the outcome to the network/system 64 via the physical adapter 60.

While it is envisioned that numerous embodiments of a transparently extensible firewall cluster are particularly well-suited for computerized systems, nothing in this document is intended to limit the scope thereof. On the contrary, as used herein the term "computer system" is intended to encompass any and all devices capable of storing and processing information and/or capable of using the stored information to control the behavior or execution of the device itself, regardless of whether such devices are electronic; mechanical, logical, or virtual in nature.

The various techniques described herein can be implemented in connection with hardware or software or, where appropriate, with a combination of both. Thus, the methods and apparatuses for implementing a transparently extensible firewall cluster, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing a transparently extensible firewall cluster.

The program(s) can be implemented in assembly or machine language, if desired. In any case, the language can be a compiled or interpreted language, and combined with hardware implementations. The methods and apparatuses for a transparently extensible firewall cluster also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing a transparently extensible firewall cluster. When implemented on a general-purpose processor, the program code combines with the processor to provide a unique apparatus that operates to invoke the functionality of a transparently extensible firewall cluster. Additionally, any storage techniques used in connection with a transparently extensible firewall cluster can invariably be a combination of hardware and software.

While a transparently extensible firewall cluster has been described in connection with the example embodiments of the various figures, it is to be understood that other similar embodiments can be used or modifications and additions can be made to the described embodiments for performing the same functions for implementing a transparently extensible firewall cluster without deviating therefrom. Therefore, a transparently extensible firewall cluster as described herein should not be limited to any single embodiment, but rather should be construed in breadth and scope in accordance with the appended claims.

What is claimed:

1. A method comprising:
operating a firewall cluster comprising a plurality of firewall processors in a master-slave configuration to manage and coordinate message traffic across the firewall cluster, wherein any given firewall processor among the plurality of firewall processors can operate as both a master firewall processor for first message traffic and as a slave firewall processor for second message traffic that is assigned to another master firewall processor, wherein operating the firewall cluster in a master-slave configuration comprises:
receiving message traffic by a receiving processor, wherein the receiving processor is a firewall processor among the plurality of firewall processors forming the firewall cluster, and wherein the message traffic is originated from a first network;

determining by the receiving processor, if the receiving processor is a master firewall processor within the firewall cluster, which is assigned to process the message traffic received by said receiving processor;

determining by the receiving processor, if another firewall processor within the firewall cluster is a master firewall processor which is assigned to process the received message traffic;

if the receiving processor is a master firewall processor assigned to process the received message traffic, allowing the receiving processor to evaluate the received message traffic in accordance with firewall policy comprising determining a matching state, and transmit the received message traffic through a virtual adapter of the receiving processor to a physical adapter of a slave firewall processor, the virtual adapter of the receiving processor allowing the receiver processor to control the physical adapter of the slave firewall processor, the slave firewall processor operative as a conduit to route the received message traffic to a second network that is different than the first network; and if another firewall processor is determined to be a master firewall processor that is assigned to process the received message traffic, the receiving processor operative as a slave processor that is configured as a conduit to route the received message traffic to the another firewall processor determined as a master firewall processor.

2. A method in accordance with claim 1, further comprising:

determining by the receiving processor, if the matching state indicates that the received message traffic has a context connecting said message traffic to an existing logical connection that is based on at least one of an IP source address or an IP destination address of the message traffic; and determining if a master firewall processor other than the receiving processor, within the firewall cluster is associated with the logical connection.

3. A method in accordance with claim 1, further comprising, if no master firewall processor is assigned to process the received message traffic:

newly assigning one of the firewall processors among the plurality of firewall processors as a master firewall processor to process the received message traffic; and if the receiving processor is not the newly assigned master firewall processor, routing the received message traffic to the newly assigned master firewall processor.

4. A method in accordance with claim 3, wherein the newly assigned master firewall processor comprises the receiving processor.

5. A method in accordance with claim 1, further comprising:

if no master firewall processor is assigned to process the message traffic:

determining, in accordance with a load balancing process, an availability of a firewall processor of the plurality firewall processors to process the message traffic; and newly assigning an available firewall processor as a master firewall processor to process the message traffic.

6. A method in accordance with claim 1, further comprising utilizing at least one of an IP source address of the message traffic, or an IP destination address of the message traffic to determine which firewall processor of the plurality of firewall processors is assigned to process the message traffic.

7. A method in accordance with claim 1, further comprising utilizing at least one of an IP source address of the message traffic, or an IP destination address of the message traffic to newly assign a firewall processor of the plurality of firewall processors to process the message traffic.

8. A method in accordance with claim 1, wherein evaluating message traffic comprises:

generating a decision about the message traffic as a result of the evaluation; and providing the decision to at least one other firewall processor of the plurality of firewall processors.

9. A system comprising:

a firewall cluster comprising a plurality of firewall processors implemented in a master-slave configuration to manage and coordinate message traffic originated from a first network and forwarded through a master firewall processor and a slave firewall processor of the firewall cluster to a second network that is different than the first network, wherein for a first logical connection, a first firewall processor among the plurality of firewall processors in the firewall cluster is assigned as a master firewall processor to control message traffic associated with the first logical connection, wherein the first firewall processor when assigned as a master firewall processor defines the behavior of at least one other firewall processor within the firewall cluster to operate as a slave firewall processor for processing message traffic associated with the first logical connection, and wherein the first firewall processor is configured to operate as a slave firewall processor to a second firewall processor assigned as a master firewall processor to control message traffic associated with a second logical connection.

10. A firewall in accordance with claim 9, further comprising a receiving firewall processor comprising any one firewall processor of the plurality of firewall processors, the receiving processor for:

receiving message traffic;

determining if the received message traffic is associated with a logical connection;

if the received message traffic is associated with a logical connection, routing the received message traffic to a master firewall processor assigned to the logical connection;

if the received message traffic is not associated with a logical connection, generating a logical connection for the received message traffic.

11. A firewall in accordance with claim 10, the receiving processor further for:

determining if the receiving firewall processor is a master firewall processor of the received message traffic;

determining if a firewall processor of the plurality of firewall processors other than the receiving firewall processor is a master firewall processor of the received message traffic;

if the other firewall processor is a master firewall processor of the received message traffic, routing the received message traffic to the other firewall processor; and if no firewall processor is a master firewall processor of the received message traffic:

newly assigning one of the firewall processors of the plurality of firewalls processors as a master firewall processor of the received message traffic; and routing the received message traffic to the newly assigned master firewall processor.

12. A firewall in accordance with claim 11, wherein the newly assigned master firewall processor remains as the master firewall processor of a logical connection associated with the received message traffic until completion of the logical connection.

13. A firewall in accordance with claim 11, the receiving firewall processor further for:
   if no firewall processor is a master firewall processor of the received message traffic:
      determining, in accordance with a load balancing process, an availability of a firewall processor of the plurality of firewall processors to be a master firewall processor of the received message traffic; and
      newly assigning an available firewall processor as a master firewall processor of the received message traffic.

14. A firewall in accordance with claim 11, the receiving firewall processor further for utilizing at least one of an IP source address of the message traffic, or an IP destination address of the message traffic to define at least one of the first or the second logical connection and to determine if the receiving processor or the other firewall processor is assigned to process the message traffic.

15. A firewall in accordance with claim 9, wherein the master firewall processor evaluates message traffic associated with the first logical connection in accordance with rules of a firewall policy and wherein a slave firewall processor transfers message traffic therethrough to the master firewall processor.

16. A firewall in accordance with claim 9, wherein the master firewall processor evaluates message traffic associated with the first logical connection in accordance with rules of a firewall policy, and generates a decision about the respective message traffic as a result of the evaluation.

17. A firewall in accordance with claim 9, wherein each firewall processor of the plurality of firewall processors comprises:
   at least one physical adapter for at least one of receiving and providing message traffic; and
   at least one virtual adapter for allowing the firewall processor, when serving as a master firewall processor for a given logical connection, to control a physical adapter of another firewall processor serving as a slave firewall processor for the given logical connection.

* * * * *